May 20, 1941.    A. M. GEORGIEV    2,242,780
CONDUCTOR MOUNTING FOR CAPACITOR MOTORS
Filed March 30, 1939

INVENTOR
Alexander M. Georgiev
BY
Spencer, Hardman & Fay
ATTORNEYS

Patented May 20, 1941

2,242,780

UNITED STATES PATENT OFFICE 2,242,780

CONDUCTOR MOUNTING FOR CAPACITOR MOTORS

Alexander M. Georgiev, Dayton, Ohio, assignor to General Motors Corporation, Detroit, Mich., a corporation of Delaware Application March 30, 1939, Serial No. 264,887

8 Claims. (Cl. 175—315)

This invention relates to the mounting of electrolytic condensers upon motors, principally of the capacitor type.

One object of the invention is to provide a mounting for an electrolytic condenser on a motor frame such that an operator will be protected against shock from the condenser casing.

A further object of the invention is to provide a compact mounting for a condenser upon the frame of a motor or like device, and also provide a mounting in which there will be no electrically exposed parts.

A further object of the invention is to provide a condenser casing that will have side outlets for the respective terminals, whereby the conventional composition "Bakelite" head member may be dispensed with.

A further object of the invention is to perfect electrolytic condensers, that have side outlets for the terminals to the electrodes, thereby decreasing the cost of manufacture.

A still further object of the invention is to provide a condenser mounting for capacitor motors, that will eliminate the usual noise component found in prior art devices.

These several objects are accomplished by providing a condenser casing of tubular form of sufficient length preferably greater than the length of the condenser section, such that tubular extrusions may be provided for passage of the electrode leads. The casing is then dipped in some non-conducting fluid-like insulator such as a colloidal rubber composition that coats both the interior and exterior of the casing completely, including the extrusions. The condenser section is then placed in position and the respective leads threaded out thru the tubular extrusions, and an impervious, preferably a metal head member is inserted in the open end of the casing, where it is spun or crimped into place. This being done the condenser unit is then again dipped in rubber or like composition, after which it is allowed to dry, thus providing a complete enclosure of rubber about the casing and the juncture of the leads and extrusions. The motor frame is then prepared for mounting of the condenser by providing passages for the leads, and a recess in the outer surface of the frame to receive the extending portions of the extrusions. An insulator placed between the condenser and a rubber covered bracket secures the condenser in place.

Further objects and advantages of the present invention will be apparent from the following description, reference being had to the accompanying drawing wherein a preferred embodiment of the present invention is clearly shown.

Figure 1:
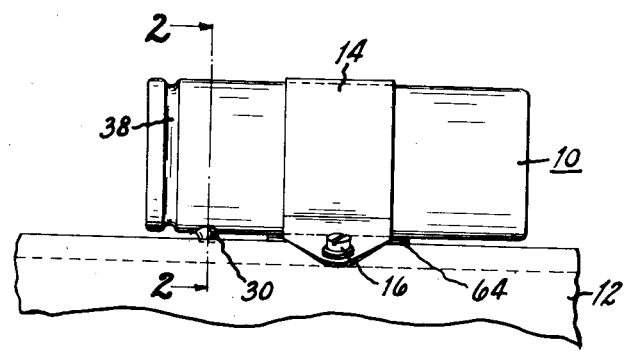
Fig. 1 is a fragmentary view of a motor frame with a condenser mounted thereon all being shown in elevation.

With respect to capacitor motors, the fire underwriters require that there shall not be exposed energized parts on the condenser; furthermore, they insist on a substantial shielding or protection of vulnerable parts, like rubber covered wire leads, paper covers etc.

That is the reason why in conventional assemblies a steel housing of appreciable size and cost has been used.

As to the conventional mounting of an electrolytic condenser on a motor of the capacitor type, it has been the practice to use an insulating cover, a supporting member and a steel housing surrounding the whole, which latter is mounted upon the motor frame. The insulating cover usually consists of a heavy wax-impregnated paper tube with paper end pieces, the supporting member being a spring cradle or the like. The housing has been of metal such as steel, that was secured to the motor frame. Each of these pieces is of more or less expensive manufacture and involves a considerable amount of labor in assembling and properly securing in place. I have devised a simplified form of electrolytic condenser mounting, which will reduce the labor involved in the assembly, and also reduce the cost of both the condenser itself, and the mounting it affords.

With my construction, the can proper of the condenser has a substantial wall thickness of the order of .025" in thickness so as to meet the underwriters' requirements for mechanical strength, which thus eliminates the necessity of using a steel housing thereabout to afford the mechanical protection. To provide adequate electrical insulation for the condenser can, the latter is coated both on the inside and outside with a suitable rubber compound, or varnish, of high insulating resistance qualities. This coating replaces the impregnated paper tube that has been heretofore used. I am also able to dispense with the usual cradle or spring strip, since I can replace it by a strip of rubber or of wag-impregnated paper inserted between the condenser and the motor frame. A rubber-covered steel strap is then placed over the condenser and clamped to the motor frame. To protect the wire leads and reduce the cost of the condenser proper, the leads are brought out of the condenser and introduced into the motor from the side of condenser. By reason of this I replace the comparatively expensive molded condenser lid with an inexpensive steel or other metal disc which can be a punch-press stamping.

To prevent a possible leak of electrolyte at the point where the wires are brought out of the condenser, extrusions of the casing are made in the can and the sleeves thus formed are squeezed around the rubber covered wires. As an additional precaution against electrolyte leaks rubber or other suitable cement is applied at these points, that is the points of juncture between the casing and lid and the leads and extrusions.

The wires are preferably made of aluminum strands to prevent their attack by the electrolyte and electrolysis. If desired the protruding ends of these aluminum wires may be spliced to the usual copper wires to facilitate their soldering. As an alternative the ends of the aluminum wires may be coated with tin or zinc which will likewise make soldering easier.

The new assembly reduces the cost and overall dimensions of the condenser mounting. Furthermore, it permits the mounting of condensers of various size within a very large range, while with the conventional assembly the dimensions of the condenser housing are a limiting factor. Finally, the rubber coated condenser can minimize the drawback of vibration noises originating at the condenser.

With respect to the drawing in particular, 10 indicates generally a condenser of the type described that is mounted upon a motor frame 12, by means of a clamp band 14 secured to the frame by clamp screws 16.

The condenser 10 per se includes a can of tubular form 18 having an inner coating 20 of rubber and an outer coating 22 of the same material. Disposed within the condenser casing 18, there is the usual condenser section 24 terminating with the leads 26 to which are connected leads 28.

Figures 2, 4, 5:
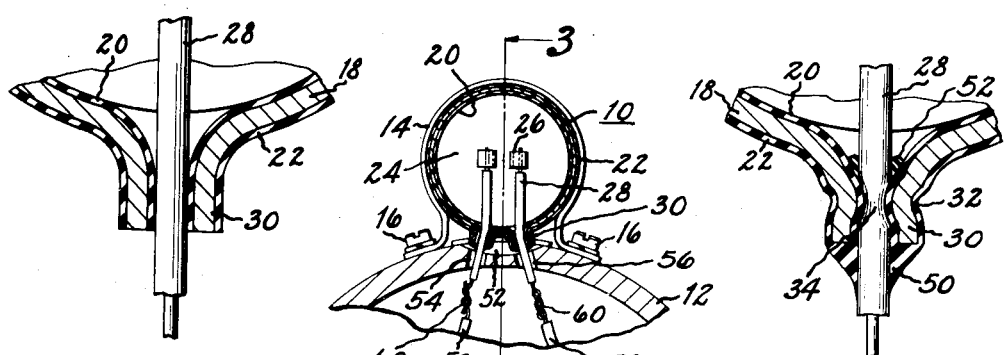
Fig. 2 is a transverse sectional view thru the condenser and motor frame, substantially as indicated by the line and arrows 2—2 of Fig. 1.
Figs. 4 and 5 are enlarged sectional views, showing details of the juncture between the casing extrusions and insulated leads before and after, respectively, completion of the seal.

The details of construction for passage of the lead 28 to the outside of the condenser casing 18 is illustrated in an enlarged view in Fig. 4. To accomplish this, the casing wall 18 is provided with the necessary number of extrusions 30 in the form of tubular projections outwardly in radial or substantial radial direction. These tubular extensions, when the can is dipped in the insulating compound, are coated inside and out with the rubber or other insulation covering. After the condenser section 24 has been disposed within the casing the leads 28 are threaded thru the tubular extensions or extrusions substantially as indicated in Fig. 4, and when the leads have been drawn to proper position, the extrusions are necked in as at 32, shown in Fig. 5, to form a ring or projection compressing the body of the lead insulation as indicated at 34. That practice completely seals the juncture of the can and lead so that there is no possibility of the electrolyte or vapor passing between the casing and insulation of the lead 28.

Figure 3:
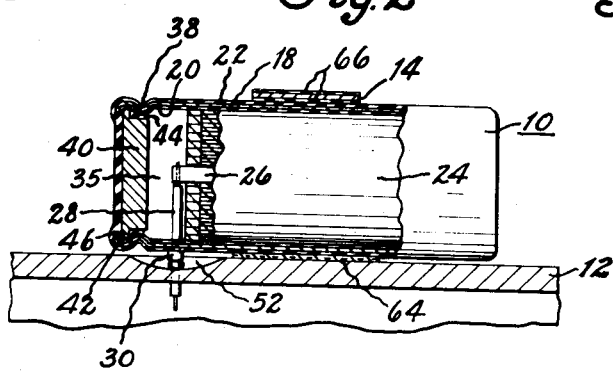
Fig. 3 is a longitudinal sectional view substantially as indicated by the line and arrows 3—3 of Fig. 2.

Final sealing of the condenser casing is effected as illustrated in Fig. 3. The open end of the casing, as stated hereinabove, has been coated with the insulating covering 20 and 22. Between the terminal edge and the condenser section 24, and spaced therefrom to provide a chamber 36 for clearance of the leads 28 and their juncture with the electrode 26, an inwardly directed peripheral rib 38 is formed to provide a shoulder against which a closure member may be seated. The closure member comprises a disc, that may be of steel or other impervious material 40, having a rabbet edge 42, and designed to seat a rubber gasket 44. When the disc is positioned within the open end of the casing, it rests against the shoulder 38 and the terminal edge of the casing is spun or crimped inwardly as at 46, to clamp the head member 40 against the shoulder and compress the gasket 44 for sealing the juncture of the head and casing. After the casing has been so completely closed and sealed, the completed end is then dipped into some insulating compound, such as a rubber solution, which coats the end of the head member 40 and the tubular extension 30 and the juncture with the lead 28, all of which is shown in Figs. 3 and 5 where it will be noticed that the coating 22 extends somewhat along the exterior end of the lead 28, thus sealing the juncture against ingress or egress of vapors as at 50. As a greater assurance against leaking by the juncture at this point, cement 52 may be applied to seal the juncture between the insulation of the lead 28 and the tubular extension 30 before the head member 40 is attached.

Making for close assembly of the condenser with respect to the motor frame 12 the latter is particularly fashioned to accommodate the extending portions of the tubular extrusions 30, insofar as a recess or countersink 52, has bores 54 and 56 allowing the passage of the lead 28 to the interior of the frame 12, where they may be spliced or otherwise connected to the winding leads 58 as indicated at 60. Thus, when the condenser is mounted upon the motor frame, it lies in close juxtaposition to the frame 12, it being separated therefrom only by the insulator 64 disposed therebetween, and so that the tubular extensions 30 project inwardly into the contour of the frame 12 to be substantially housed by the recess 52. As before stated, the clamp ring 14 operates to hold the condenser in particular position on the motor frame and to perfect its insulation, it, too, is covered with an insulating coating 66 which likewise may be of rubber solution and having air drying properties, or otherwise coagulated. When it is affixed about the condenser and secured to the motor frame 12 by the screws 16 it securely clamps the condenser upon the motor frame 12 as fully illustrated in the drawing.

While the embodiment of the present invention as hereindisclosed, constitutes a preferred form, it is to be understood that other forms might be adopted, all coming within the scope of the claims which follow.

What is claimed is as follows:

1. In a capacitor motor, means for mounting a capacitance on the frame of a motor comprising in combination, a metallic condenser casing, said casing having extrusions for the passage of insulated leads, a coating of non-conducting material immersing said condenser casing and extrusions, said motor frame providing a recess for reception of the extrusions of the casing, a clamp bracket for maintaining the extrusion of the condenser casing within the frame recess, said bracket being completely covered with non-conducting material.

2. The combination set forth in claim 1 wherein the nonconducting coating about the condenser casing and bracket consists in a non-fibrous coating of air-dried rubber.

3. In a condenser for a capacitor motor, the combination comprising, a condenser section having leads with soft compressible insulation extending therefrom, a metallic casing surrounding the condenser section, an impervious head member closing the casing, said casing member having extrusions thereof each for the passage of a condenser lead, means at the juncture of the casing and head member and at the juncture of the extrusions and leads for isolating the interior from the exterior of the casing, said casing extrusions being peripherally reduced to compress the insulation of the leads, and a coating of rubber entirely surrounding the casing and extrusions whereby the casing is adequately protected against shock to attending persons.

4. The combination set forth in claim 3 wherein the extrusions are necked down into the insulation of the respective leads, and cement is applied at the juncture of the necking and leads.

5. In a capacitor motor assembly including a motor frame and a condenser with leads extending therefrom, the combination comprising, tubular extrusions laterally of the condenser for enclosing and protecting the leads, and means for mounting the condenser on the motor frame in a compact relation, including apertures in the motor frame for passage of the condenser leads therethrough, said apertures being enlarged at the outer end to provide a recess for spaced reception of the tubular extrusions of the condenser, and means for mounting and rigidly supporting the condenser on the motor frame so that the condenser leads and extrusions are relatively inaccessible.

6. In a capacitor motor assembly including a motor frame and a condenser with leads extending therefrom, the combination comprising, tubular extrusions provided by the condenser case for enclosing the leads therefrom, means for mounting the condenser in insulated relation but substantially against the motor frame, and so that the axes of the motor and condensers are in substantial parallelism, and means preventing accidental engagement with the condenser leads and extrusions including apertured recesses of the frame for passage of the leads therethrough and for reception of the case extrusions in spaced relation to the frame, but substantially enclosing the same so that the case extrusions extend partially into the frame recess, said condenser and mounting means each being completely covered with a layer of noncrystalline yieldable insulating material.

7. In a capacitor motor, a condenser having a case with leads extending laterally therefrom, a thin coating of rubber like material completely surrounding the condenser casing and juncture of leads, means for mounting the insulating condenser closely against the motor frame, said motor frame being recessed for reception of the extending leads, and to permit passage of the leads to the interior of the frame, the rubber like coating of the casing insulating it from the motor frame, and against shock to attending persons.

8. In an electrolytic condenser, the combination comprising, a condenser section having lead extensions, a metallic casing including a head member completely inclosing the condenser section, said casing having tubular extrusions closely embracing the lead extensions, a monolithic coating of insulating material completely covering the interior and exterior surfaces of the casing, and the interior and exterior of the tubular extrusions of the casing for passing the leads to the exterior of the casing.

ALEXANDER M. GEORGIEV.